(12) United States Patent
Gunji et al.

(10) Patent No.: US 11,011,751 B2
(45) Date of Patent: May 18, 2021

(54) POSITIVE ELECTRODE ACTIVE MATERIAL FOR LITHIUM ION SECONDARY BATTERY, MANUFACTURING METHOD THEREOF, AND LITHIUM ION SECONDARY BATTERY

(71) Applicant: HITACHI METALS, LTD., Tokyo (JP)

(72) Inventors: Akira Gunji, Tokyo (JP); Tatsuya Toyama, Tokyo (JP); Shin Takahashi, Tokyo (JP); Takashi Nakabayashi, Tokyo (JP); Shuichi Takano, Tokyo (JP); Xiaoliang Feng, Tokyo (JP); Sho Furutsuki, Tokyo (JP); Hisato Tokoro, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 1109 days.

(21) Appl. No.: 14/873,773

(22) Filed: Oct. 2, 2015

(65) Prior Publication Data

US 2016/0118648 A1 Apr. 28, 2016

(30) Foreign Application Priority Data

Oct. 20, 2014 (JP) .............................. JP2014-213805
Jun. 12, 2015 (JP) .............................. JP2015-119082

(51) Int. Cl.
*H01M 4/52* (2010.01)
*H01M 10/05* (2010.01)
(Continued)

(52) U.S. Cl.
CPC ............ *H01M 4/525* (2013.01); *C01G 53/42* (2013.01); *C01G 53/50* (2013.01);
(Continued)

(58) Field of Classification Search
None
See application file for complete search history.

(56) References Cited

U.S. PATENT DOCUMENTS

| 5,718,989 A | * | 2/1998 | Aoki | ..................... H01M 4/525 |
|---|---|---|---|---|
| | | | | 429/223 |
| 8,753,532 B2 | * | 6/2014 | Levasseur | ............. H01M 4/364 |
| | | | | 252/182.1 |

(Continued)

FOREIGN PATENT DOCUMENTS

| JP | 2001-076724 | * | 3/2001 | ............. H01M 4/58 |
|---|---|---|---|---|
| JP | 2001076724 A | | 3/2001 | |

(Continued)

OTHER PUBLICATIONS

Seong-Min Bak et al., Structural changes and thermal stability of charged LiNixMnyCozO2 cathode materials studied by combined in situ time-resolved XRD and mass spectroscopy, American Chemical Society, Appl. Mater. Interfaces, 2014, 6 (24), pp. 22594-22601. (Year: 2014).*

(Continued)

*Primary Examiner* — Jonathan Crepeau
*Assistant Examiner* — Angela J Martin
(74) *Attorney, Agent, or Firm* — Volpe Koenig (57) ABSTRACT

A compound having a layered structure that is used for a positive electrode active material for a lithium ion secondary battery achieves both a high energy density and a high cyclability. The positive electrode active material for a lithium ion secondary battery contains a compound having a layered structure belonging to a space group R-3m, in which the compound having a layered structure is represented by a compositional formula: $Li_{1+a}M1O_{2+\alpha}$ wherein M1 represents a metal element or metal elements other than Li, and contains at least Ni, $-0.03 \leq a \leq 0.10$, and $-0.1 < \alpha < 0.1$, a proportion of Ni in M1 is larger than 70 atom %, and a site (Continued)

occupancy of a transition metal or transition metals at a 3a site obtained by structural analysis by a Rietveld method is less than 2%, and a content of residual lithium hydroxide in the positive electrode active material is 1 mass % or less.

9 Claims, 2 Drawing Sheets

(51) Int. Cl.
    *H01M 4/525*    (2010.01)
    *C01G 53/00*     (2006.01)
    *H01M 10/052*   (2010.01)
    *H01M 4/02*     (2006.01)

(52) U.S. Cl.
    CPC ....... *H01M 10/052* (2013.01); *C01P 2002/20* (2013.01); *C01P 2002/76* (2013.01); *C01P 2004/61* (2013.01); *C01P 2006/40* (2013.01); *H01M 2004/028* (2013.01); *Y02T 10/70* (2013.01)

(56) References Cited

U.S. PATENT DOCUMENTS

| | | |
|---|---|---|
| 2009/0104530 A1 | 4/2009 | Shizuka |
| 2009/0117469 A1 | 5/2009 | Hiratsuka et al. |
| 2011/0143205 A1* | 6/2011 | Makimura ............ H01M 4/131 429/223 |
| 2011/0318638 A1* | 12/2011 | Koh .................... H01M 4/0404 429/217 |
| 2013/0236783 A1* | 9/2013 | Kose ....................... H01M 4/13 429/211 |

FOREIGN PATENT DOCUMENTS

| | | | |
|---|---|---|---|
| JP | 2011-113885 A | 6/2011 | |
| JP | 2012-043716 A | 3/2012 | |
| JP | 2014-040363 A | 3/2014 | |
| JP | 2015-056368 A | 3/2015 | |
| KR | 10-2008-0108222 A | 12/2008 | |
| KR | 10-2011-0061204 A | 6/2011 | |
| KR | 10-1171734 * | 8/2012 | .............. H01M 4/02 |
| KR | 10-1171734 A | 8/2012 | |
| KR | 10-2013-0130357 A | 12/2013 | |
| WO | 2009/060603 A1 | 5/2009 | |

OTHER PUBLICATIONS

Korean Office Action for Korean Patent Application No. 10-2015-0138460 dated Dec. 21, 2016.

Japanese Office Action dated Jan. 8, 2019 for the Japanese Patent Application No. 2015-119082.

* cited by examiner

POSITIVE ELECTRODE ACTIVE MATERIAL FOR LITHIUM ION SECONDARY BATTERY, MANUFACTURING METHOD THEREOF, AND LITHIUM ION SECONDARY BATTERY

CLAIM OF PRIORITY

The present application claims priority from Japanese patent application JP 2014-213805 filed on Oct. 20, 2014 and Japanese patent application JP 2015-119082 filed on Jun. 12, 2015, the content of which is hereby incorporated by reference into this application.

BACKGROUND OF THE INVENTION

Field of the Invention

The present invention relates to a positive electrode active material for a lithium ion secondary battery, a manufacturing method thereof, and a lithium ion secondary battery.

Background Art

In recent years, expectations have been centered on electric cars that consume less energy required for driving and power generating systems that utilize natural energy such as solar light or wind power from the standpoint of the prevention of global warming and from concern over depletion of fossil fuels. However, these technologies have the following technical problems and have not been widely spread.

The problem of the electric cars is that the energy density of batteries for driving is low and a travel distance by one charge is short. On the other hand, the problem of the power generating systems that utilize natural energy is that variation in the amount of power generation is large and high-capacity batteries are needed for leveling the output, resulting in high costs. A secondary battery having a high energy density at low cost has been desired in order to solve the above-described problems in both technologies.

For example, lithium ion secondary batteries have a high energy density per weight when compared with other secondary batteries such as nickel hydrogen batteries and lead batteries, and therefore the application to batteries for driving an electric car and electric power storage systems are expected. However, the energy density of the lithium ion secondary batteries has to be made further higher in order to meet the requirements of the batteries for driving an electric car and the electric power storage systems. For the purpose of achieving the goal, it is necessary that the energy density of the positive electrode and the negative electrode be increased.

As a positive electrode active material that constitutes the positive electrode of a lithium ion secondary battery, a material having a layered structure belonging to a space group R-3m, the material represented by a compositional formula $LiM1O_2$ (compound having a layered structure, and M1 represents a metal element or metal elements other than Li) is widely used. In the case where a large amount of Ni is contained as the metal element or elements M1, there is a tendency that the capacity increases as the proportion of Ni is higher, particularly in the case where the proportion of Ni in the metal element or elements M1 exceeds 70 atom %, it becomes possible to obtain a reversible capacity of exceeding 180 Ah/kg to improve the energy density.

However, in the case where the proportion of Ni in the metal element or elements is high, a site exchange by Ni to a Li site, the site exchange called cation mixing, becomes easy to occur. The number of valence of Ni introduced to the Li site does not change, and the Ni cannot contribute to charge and discharge, and, as a result thereof, the capacity of batteries becomes lowered or the resistance of batteries becomes high.

As a method for suppressing the cation mixing, a method in which a Li raw material is added in an excessive amount exceeding a stoichiometric ratio is general. However, in the case where the proportion of Ni in the metal element or elements is high, excessive Li is hard to incorporate in a positive electrode crystal. Therefore, the Li raw material, even when added in an excessive amount, cannot sufficiently react in the firing step, resulting in increasing the amount of Li left on the surface of the positive electrode crystal.

The residual Li compound exists mainly as lithium hydroxide and lithium carbonate. The lithium hydroxide in particular contains crystal water, further, is deliquescent, and therefore is easy to produce water in the battery, and the produced water produces HF that becomes a cause of metal elution or facilitates electrolyte decomposition, and therefore becomes a cause of an increase in resistance or lowering of capacity associated with charge-discharge cycles.

In International Publication No. WO2009/060603, a technology is disclosed that suppresses a disorder (cation mixing) by which a lithium ion is replaced with a nickel ion; that makes it possible to use low-cost lithium carbonate and that achieves a high capacity, a high safety, load characteristics, and cycle life by suppressing the proportion of Ni to 70 atom % or less.

In JP Patent Publication (Kokai) No. 2014-40363, a technology is disclosed that achieves both the high capacity and the cyclability by making a cation mixing ratio 2.0% or more and 6.0% or less by structural analysis by a Rietveld method in a complex oxide represented by $Li_xMeO_{2+0.5(x-1)}$ (in the formula, Me represents transition metals containing Ni and at least one metal selected from transition metals other than Ni) in which an atomic ratio of Ni to Me ($A=Ni/Me \times 100$) is 60 mol % or more and 90 mol % or less in the whole particle, and a value of the atomic ratio in the central part (core) is smaller than a value of the atomic ratio in the peripheral part (shell). In addition, the above-described "the whole particle" means the whole particle including the core and the shell.

SUMMARY OF THE INVENTION

In the case of International Publication No. WO2009/060603, since the proportion of Ni is made to be 70 atom % or less, a high capacity that exceeds 180 Ah/kg is not obtained. In the case where the proportion of Ni is made to be a value exceeding 70%, it is considered that it is essential to use lithium hydroxide as a raw material in order to obtain a high capacity, and when lithium hydroxide is used as a raw material, it is anticipated that the proportion of lithium hydroxide that is left on the surface of the positive electrode crystal becomes high, and it becomes difficult to suppress the increase in resistance and the lowering in capacity.

In JP Patent Publication (Kokai) No. 2014-40363, the cation mixing ratio (site occupancy of transition metal or transition metals at 3a site) is high, as high as 2.0% or more. Although a positive electrode active material that has a lower cation mixing ratio (Comparative Example 2 in JP Patent Publication (Kokai) No. 2014-40363) is described, Li is excessive in the positive electrode active material, and it is considered that it is difficult to suppress the production of lithium hydroxide on the surface of the positive electrode crystal.

Thus, the present invention intends to provide a positive electrode active material for a lithium ion secondary battery achieving both a high energy density and a high cyclability, a manufacturing method thereof, and a lithium ion secondary battery using the positive electrode active material.

In order to achieve the object, the positive electrode active material of the present invention is a positive electrode active material for a lithium ion secondary battery, containing a compound having a layered structure belonging to a space group R-3m, in which the compound having a layered structure is represented by a compositional formula: $Li_{1+a}M1O_{2+\alpha}$ wherein M1 represents a metal element or metal elements other than Li, and contains at least Ni, $-0.03 \leq a \leq 0.10$, and $-0.1 < \alpha < 0.1$, a proportion of Ni in M1 is larger then 70 atom %, and a site occupancy of a transition metal or transition metals at a 3a site obtained by structural analysis by a Rietveld method is less than 2%, and a content of residual lithium hydroxide in the positive electrode active material is 1 mass % or less. In addition, the positive electrode active material in the present DESCRIPTION means a material including the compound having a layered structure (positive electrode crystal) that is a crystal capable of intercalate and deintercalate Li ions and the Li compound that is left on the surface of the compound having a layered structure and that is an impurity containing mainly lithium hydroxide and lithium carbonate.

Moreover, in order to achieve the object, as the manufacturing method of the positive electrode active material for a lithium ion secondary battery of the present invention, a manufacturing method can be applied that includes: a pulverizing and mixing step of pulverizing and mixing a raw material containing a metal element other than Li with a lithium raw material comprising 80 mass % or more of lithium carbonate so as to make an average particle diameter of the raw material and the lithium raw material 0.3 μm or less; a heat treatment step of heat-treating, at 650° C. or lower, a pulverized and mixed powder obtained through the pulverizing and mixing step; and a firing step of firing, at 740° C. or higher and lower than 850° C., the heat-treated pulverized and mixed powder.

Furthermore, in order to achieve the object, the lithium ion secondary battery of the present invention includes: a positive electrode containing the positive electrode active material; a negative electrode; and a separator.

According to the present invention, it becomes possible to provide a lithium ion secondary battery achieving both a high energy density and a high cyclability.

The problems, the constitution, and the effects other than what are described previously will be made clear by the description of the following embodiments.

DETAILED DESCRIPTION OF THE PREFERRED EMBODIMENTS

Next, the present invention will be described in more detail. In addition, the following embodiments are illustrations, and the present invention is not limited to these embodiments.

As the lithium ion secondary battery of the present invention, a lithium ion secondary battery having any shape, such as a cylindrical type, a flat type, a rectangular type, a coin type, a button type, or a sheet type lithium ion secondary battery may be used, and the same basic constitution as the basic constitution in the conventional lithium ion secondary batteries can be adopted. For example, the constitution including a positive electrode, a negative electrode, and a separator interposed between the positive electrode and the negative electrode and impregnated in an organic electrolyte may be adopted. In addition, the separator impregnated in an organic electrolyte prevents a short circuit by separating the positive electrode and the negative electrode, and has ion conductivity that allows lithium ions ($Li^+$) to pass. Further, the positive electrode is constituted from the positive electrode active material, a conductive material, a binder, a collector, and so on, and the positive electrode is made by applying a positive electrode mixture containing the positive electrode active material, the conductive material, and the binder on the collector to form a mixture layer.

(Positive Electrode Active Material)

The positive electrode active material includes the positive electrode crystal and the lithium compound as an impurity. The positive electrode crystal contains a lithium metal complex oxide, and contains Ni in a ratio exceeding 70 atom % of the metal element or elements other than Li. The metal composition in the positive electrode crystal can be confirmed by, for example, ICP-AES analysis.

Further, the crystal structure of the positive electrode crystal is a layered structure belonging to a space group R-3m, and the site occupancy of the transition metal or transition metals at the 3a site is less than 2%. The site occupancy is further desirably less than 1.6%. The site occupancy can be calculated by performing Rietveld analysis of an X-ray diffraction profile of the positive electrode crystal. When the site occupancy of a transition metal or transition metals at the 3a site is 2% or more, the amount of Ni that cannot contribute to charge and discharge increases to lower the capacity of a battery.

Further, the content of the residual lithium hydroxide that is an impurity is 1 mass % or less in the positive electrode active material. The content is further desirably 0.5 mass % or less. The impurity that is left in the positive electrode active material is constituted mainly from lithium hydroxide and lithium carbonate, and the total amount of the residual lithium compound excluding the positive electrode crystal in the positive electrode active material is usually from 0.1 mass % to 2.0 mass % in the present invention. Moreover, the content of the lithium hydroxide and lithium carbonate as the impurity can be confirmed by, for example, dispersing the positive electrode active material in ultrapure water to which inert gas-bubbling has been performed and thereafter titrating, with an acid, a filtrate obtained by filtering the positive electrode active material.

Furthermore, in the positive electrode crystal, the ratio of Li to the metal element or elements other than Li is 0.97 or more, preferably 1.00 or more. The amount of Li in the positive electrode crystal can be calculated by subtracting the amount of Li in the residual lithium compound that is an impurity from the amount of Li in the positive electrode active material. The amount of Li in the positive electrode active material can be confioned by, for example, ICP-AES analysis, and the amount of residual Li in the impurity can be calculated by the acidimetry.

The positive electrode crystal in the present invention has a low site occupancy, and therefore has a high capacity and a low resistance. Moreover, the amount of residual lithium hydroxide that becomes a cause of electrolyte decomposition by producing water in the positive electrode active material is small, and therefore the increase in resistance and the lowering of capacity associated with charge-discharge cycles are suppressed.

Moreover, in the case where the ratio of Li to the metal element or elements other than Li in the positive electrode crystal is 1.00 or larger in the present invention, Li is not deficient, and therefore a change in the crystal structure in a charged state is suppressed. By suppressing the change in the crystal structure in a charged state, the increase in resistance and the lowering of capacity associated with the cycles are suppressed. In addition, even when the ratio of Li to the metal element or elements other than Li in the positive electrode crystal is less than 1.00, the change in the crystal structure in a charged state can be suppressed due to cation mixing by a small amount of cations as long as the ratio is 0.97 or more. When the ratio of Li to the metal element or elements other than Li is less than 0.97, the amount of Li that contributes to charge and discharge decreases, and therefore the capacity of a battery is lowered.

When the proportion of Ni in the metal element or elements other than Li exceeds 70 atom %, Li that exceeds the stoichiometric ratio is hard to incorporate in the crystal. Therefore, even though the condition [Li element]/[metal element or elements other than Li]≥1.00 is satisfied as a positive electrode active material in general, the condition [Li element]/[metal element or elements other than Li]≥1.00 is not necessarily satisfied as a positive electrode crystal. In the present invention, the ratio of Li to the metal element or elements other than Li in the positive electrode crystal, not the ratio of Li to the metal element or elements other than Li in the positive electrode active material, is specified to be 0.97 or more, preferably 1.00 or more.

The compound having a layered structure (positive electrode crystal) is represented by the compositional formula: $Li_{1+a}M1O_{2+\alpha}$ wherein M1 represents a metal element or metal elements other than Li, and contains at least Ni, $-0.03 \le a \le 0.10$, and $-0.1 < \alpha < 0.1$. Preferably, $0 \le a \le 0.10$. In addition, the value of 1+a corresponds to the ratio of Li to the metal element or elements other than Li in the positive electrode crystal. As the metal element or elements M1, various elements such as Ni, Mn, Co, Al, Zr, W, Mo, Nb, and V can be used. In the positive electrode crystal, Li is incorporated in an amount that is different from the stoichiometric ratio by an amount "a". In the case where Li that is excessive to the stoichiometric ratio is incorporated, a site where such excessive Li is incorporated is not clear, however it is anticipated that the site exists at an intermediate position that is different from the position of a transition metal site or a regular Li site. Moreover, oxygen in the compositional formula may be deficient as long as the deficiency is within a range where the layered structure can be maintained in the positive electrode crystal. The value of α is within a range where the compound having a layered structure belonging to a space group R-3m is allowed to exist.

As an embodiment of the present invention, the compound having a layered structure is represented by the compositional formula: $Li_{1+a}Ni_bMn_cCo_dM2O_{2+\alpha}$ wherein M2 represents a metal element other than Li, Ni, Mn, and Co, $-0.03 \le a \le 0.10$, $0.7 < b < 1.0$, $0 < c < 0.3$, $0 < d < 0.3$, $0 \le e \le 0.1$, b+c+d+e=1, and $-0.1 < \alpha < 0.1$. Preferably, $0 \le a \le 0.10$. As the metal element M2, various elements such as Al, Zr, W, Mo, Nb, and V can be used. Moreover, various coatings such as: an oxide of M1 or M2 such as Al, Zr, V, or Mo; an oxide of Li; and so on may be applied to the compound having a layered structure.

The positive electrode active material of the present invention is constituted, as an embodiment, from a granule (secondary particle) having an average particle diameter of 1 μm or more, the granule obtained by aggregation and bonding of a plurality of particles (primary particles) having an average particle diameter of 1 μm or less, the particle not having a grain boundary. The average particle diameter of the primary particles here is determined in such a manner that four secondary particles are arbitrarily selected from among images measured by a scanning electron microscope, then five primary particles are arbitrarily selected from among the respective secondary particles, the average value of the long side and short side that are orthogonal to each other in each primary particle is defined as the particle size of the primary particle, and the average value of all the particle diameters of the primary particles (20 particles) is defined as the average particle diameter of the primary particles contained in the positive electrode active material. Moreover, the average particle diameter of the secondary particles means a particle diameter where the cumulative distribution based on the number reaches 50%. In addition, it is desirable that the particle size of the secondary particles be 1 μm or more in terms of a particle diameter where cumulative distribution based on the number reaches 10% (10% particle diameter) and 40 μm or less in terms of a 90% particle diameter from the easiness of handling. The cumulative particle diameter distribution can be measured by a laser diffraction scattering type particle size distribution meter.

Moreover, it is desirable that the specific surface area of the positive electrode active material be 2.0 $m^2/g$ or less, further desirably 1.0 $m^2/g$ or less from the standpoint of suppressing the side reaction of the electrolytic solution. On the other hand, it is desirable that the specific surface area be 0.1 $m^2/g$ or more for the purpose of securing a charge and discharge reaction field to achieve a low resistance.

(Manufacturing Method of Positive Electrode Active Material)

The following method for example can be applied to the manufacturing of the positive electrode active material for a lithium ion secondary battery. The positive electrode active material for a lithium ion secondary battery of the present invention can be manufactured by a method including: a pulverizing and mixing step of pulverizing and mixing a raw material containing a metal element other than Li with a lithium raw material comprising 80 mass % or more of lithium carbonate so as to make an average particle diameter of the raw material and the lithium raw material 0.3 μm or less; a heat treatment step of heat-treating, at 650° C. or lower, a pulverized and mixed powder obtained through the pulverizing and mixing step; and a firing step of firing, at 740° C. or higher and lower than 850° C., the heat-treated pulverized and mixed powder. The manufacturing method preferably includes, between the pulverizing and mixing step and the heat treatment step, a granulating step of granulating the pulverized and mixed powder obtained through the pulverizing and mixing step to make aggregated particles having an average particle diameter of 1 μm or more.

The raw material containing a metal element other than Li can appropriately be selected from compounds such as carbonates, hydroxides, oxyhydroxides, acetates, citrates, and oxides that are constituted from the metal element, C, H, O, and N. The carbonates and the hydroxides are particularly desirable from the standpoint of the easiness of pulverization and the discharge amount of gases after thermal decomposition.

In the pulverization and mixing step, various methods such as a ball mill, a jet mill, and a rod mill can be used. Both a wet method in which pulverization is performed in liquid such as water and a dry method not using liquid can be used. The wet method is desirable from the standpoint of preparing a pulverized and mixed powder having a small particle diameter.

In the granulating step, a spray drying method can be used. As the spraying system, various methods such as a two-fluid nozzle, a four-fluid nozzle, a disc type can be used.

The heat treatment step and the firing step can be performed by various methods such as a batch system and a continuous system. Moreover, it is preferable that the heat treatment step and the firing step are performed in an oxidization atmosphere, particularly preferably in an oxygen atmosphere. It is preferable to allow a gas to flow so as to discharge gases generated from the raw material containing a metal element and the lithium raw material and to supply sufficient oxygen to the pulverized and mixed powder. In the present invention, heat treatment is performed at a temperature equal to or higher than the decomposition temperature and lower than 650° C. for a certain time in advance for the purpose of facilitating discharge of gases generated from the raw material containing a metal element. Here, the decomposition temperature in the present invention is different depending on the compositional formula of the pulverized and mixed powder, but is generally within a range of 200° C. or higher and 400° C. or lower. Moreover, it is preferable that the heat treatment that is performed in advance is performed under the condition of for example, 400° C. or higher and 650° C. or lower, particularly preferably 600° C. or higher and 650° C. or lower, in an oxygen atmosphere for 2 hours or more and 24 hours or less.

The suitable firing temperature varies depending on the composition or the degree of minuteness of the pulverized and mixed powder. Therefore, the firing temperature can appropriately be set considering the composition or powder properties of the pulverized and mixed powder. In the case where the firing temperature is lower than the suitable temperature, the reaction of the lithium raw material with the metal element or elements becomes insufficient to cause lowering of the amount of Li in the positive electrode crystal and an increase of cation mixing to occur. Moreover, in the case where the firing temperature is higher than the suitable temperature, the decomposition of the positive electrode crystal occurs to produce $Li_2O$, and the $Li_2O$ reacts with water in the air to produce lithium hydroxide. Therefore, it is not preferable that the firing temperature is higher than the suitable temperature because an increase in the amount of lithium hydroxide occurs. Moreover, the granular growth progresses and a high capacity cannot be obtained. Specifically, the firing temperature is set within a range of 740° C. or higher and lower than 850° C., and a further preferable range is 740° C. or higher and 825° C. or lower.

In the manufacturing method of the present invention, lithium carbonate is used as the lithium raw material for the purpose of suppressing the occurrence of residual lithium hydroxide. In the case where the proportion of Ni in the metal element or elements other than Li is 70 atom % or less, it is general to use lithium carbonate as the lithium raw material. However, in the case where the proportion of Ni in the metal element or elements other than Li is 70 atom % or more, the firing temperature has to be set at a low temperature, as low as 740° C. or higher and lower than 850° C., because the Ni—O bonding is weak and is easy to dissociate, thus the firing temperature is at a temperature near the melting point of lithium carbonate 723° C., and therefore there is a risk that the reaction occurs through which the positive electrode crystal is produced before the diffusion of lithium caused by melting of lithium carbonate to make the crystal ununiform. Accordingly, it has so far been general to use lithium hydroxide having a lower melting point for the purpose of obtaining a uniform positive electrode crystal making use of the diffusion of lithium caused by melting. On the other hand, in the present invention, by pulverizing and mixing in advance the lithium raw material containing 80 mass % or more of lithium carbonate and the raw material containing a metal element other than Li so as to make an average particle diameter of a mixture of the lithium raw material and the raw material 0.3 μm or less, the mixing state of Li and the metal element or elements other than Li becomes uniform in a region where the average particle diameter is 1 μm or less, and, as a result, a uniform positive electrode crystal can be obtained.

Lithium carbonate reacts in a state of a solid phase in the heat treatment step at 650° C. or lower, and reacts in a state of a liquid phase in the firing step at a temperature near the melting point of lithium carbonate, 740° C. or higher and lower than 850° C. Accordingly, most of lithium carbonate reacts in the state of the solid phase in the heat treatment step at 650° C. or lower, and lithium carbonate in the liquid phase produced in the firing step at 740° C. or higher and lower than 850° C. becomes scarce in amount, and therefore an abrupt grain growth due to liquid phase firing can be suppressed, making it possible to perform firing at a higher temperature. Thereby, the amount of Li in the positive electrode crystal increases and cation mixing is reduced.

(Negative Electrode)

It is preferable that the negative electrode used for a lithium ion secondary battery has a low discharge potential. As the negative electrode, various materials such as: a lithium metal; carbon that has a low discharge potential; Si that has a large capacity per volume; Sn, and alloys and oxides thereof; and lithium titanate ($Li_4Ti_5O_{12}$) having a high level of safety can be used.

(Separator)

As the separator used for a lithium ion secondary battery, any material can be used as long as the material has ion conductivity and insulation properties, and does not dissolve in electrolytic solutions, and a porous body, nonwoven fabric, etc. made of polyethylene or polypropylene are usable. As the organic electrolytic solution, an electrolytic solution obtained by dissolving a lithium salt, or the like, such as $LiPF_6$ or $LiBF_4$ in a cyclic carbonate such as ethylene carbonate (EC) or propylene carbonate (PC) or a chain carbonate such as dimethyl carbonate (DMC), ethylmethyl carbonate (EMC), or diethyl carbonate (DEC) can be used.

(Lithium Ion Secondary Battery and Utilization Thereof)

The lithium ion secondary battery including a positive electrode active material using the positive electrode active material will be described. The lithium ion secondary battery provided with the positive electrode containing the positive electrode active material, the negative electrode, and the separator can be used for a battery module, and can be applied to a power source of various vehicles such as a hybrid railway that runs with an engine and a motor, an electric car that runs with a motor using a battery as an energy source, a hybrid car, a plug-in hybrid car in which a battery can be charged from outside, and a fuel cell powered car in which electric power is taken out from the chemical reaction of hydrogen with oxygen.

Figure 1:
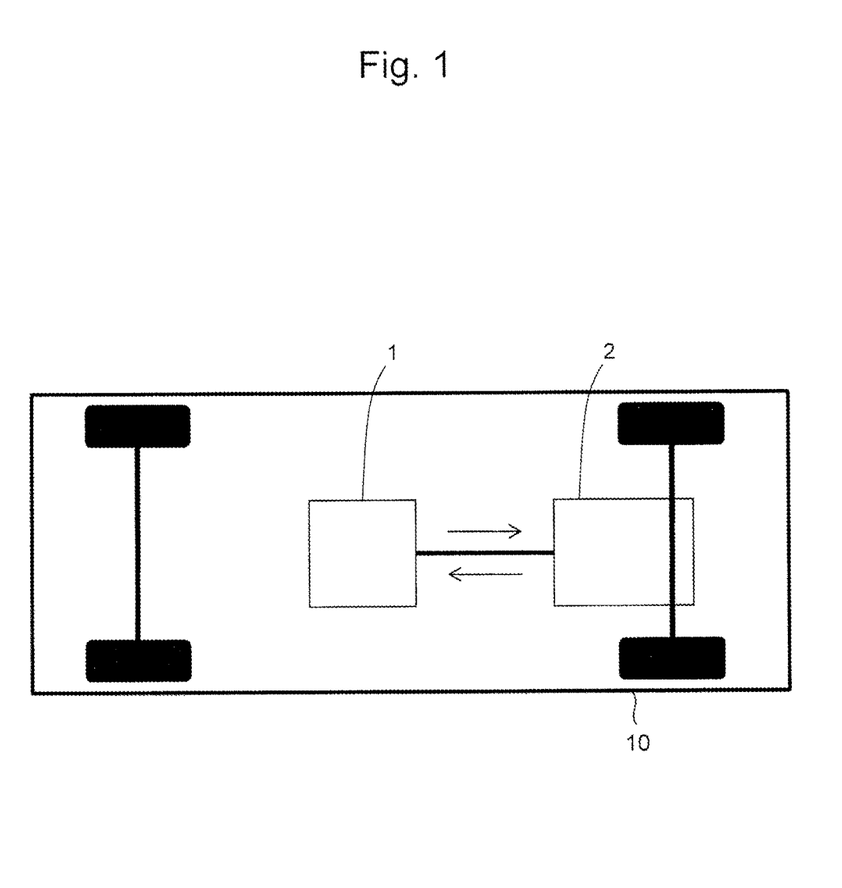
FIG. 1 is a diagram illustrating an embodiment of a system for driving an electric car, utilizing a lithium ion secondary battery of the present invention.

FIG. 1 illustrates a schematic plan view of a driving system of an electric car as a representative example. An electric car 10 is driven by supplying electric power to a motor 2 from a battery module 1 through a battery controller, a motor controller, and so on not illustrated in the figure. Moreover, the electric power regenerated by the motor 2 during deceleration is stored in the battery module 1 through the battery controller.

As illustrated in FIG. 1, by using the battery module 1 including one or more lithium ion secondary batteries each provided with a positive electrode containing the positive electrode active material of the present invention, the energy density and lifetime of the battery module are improved, and the batteries used for the system of the electric car 10 can be reduced, leading to weight reduction and cost reduction of the electric car.

In addition, the lithium ion secondary battery is widely applicable to vehicles, besides the vehicles given as examples, such as a forklift, an in-yard transporting machine at a factory or the like, an electric wheelchair, various satellites, a rocket, and a submarine, and is applicable to any vehicle having a battery (cell) without limitation.

Figure 2:
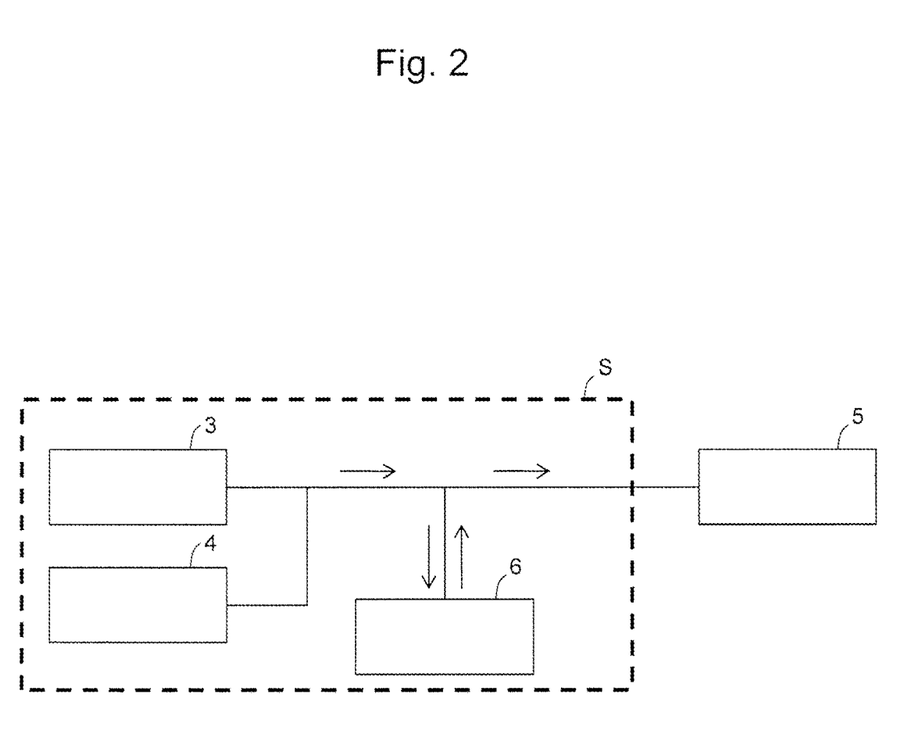
FIG. 2 is a diagram illustrating an embodiment of a power generating system utilizing a lithium ion secondary battery of the present invention.

Moreover, the battery module using one or more lithium ion secondary batteries each provided with a positive electrode containing the positive electrode active material can be applied to a power source for electric power storage of electric power generating systems (electric power storage systems) making use of natural energy such as a solar battery that converts solar ray energy into electric power and wind power generation that generates electric power by wind force. FIG. 2 illustrates the outline of power generating system.

As illustrated in FIG. 2, the amount of power generation is unstable in the power generation that makes use of natural energy such as a solar battery 3 or a wind power generating apparatus 4, and therefore it is necessary that electric power be charged and discharged from the power source for electric power storage depending on the load on the side of an electric power system 5 for the purpose of stably supplying electric power.

By applying a battery module 6 using one or more lithium ion secondary batteries each provided with a positive electrode containing the positive electrode active material to the power source for electric power storage, required capacity and output can be obtained by a small number of batteries even after a long period of use, resulting in the cost reduction of a power generating system S.

In addition, the power generating system S using the solar battery 3 or the wind power generating apparatus 4 is given as an example of the power generating system, however the power generating system is not limited to the example, and is widely applicable to power generating systems using other power generating apparatuses.

Hereinafter, the present invention will be described in more detail based on Examples and Comparative Examples. However, the technical range of the present invention is not limited to these Examples.

Example 1

Synthesis of Positive Electrode Active Material

Lithium carbonate, nickel hydroxide, cobalt hydroxide, and manganese carbonate were weighed so that the molar ratio was Li:Ni:Co:Mn=1.04:0.8:0.1:0.1, and pure water was added thereto, and the resultant mixture was pulverized and mixed using a planetary ball mill. The average particle diameter after pulverization and mixing was 0.25 μm. The obtained slurry of the pulverized and mixed powder was spray-dried with a two-fluid nozzle to make aggregated particles (secondary particles) having an average particle diameter of 10 μm. The obtained aggregated particles were heat-treated in an oxygen atmosphere at 600° C. for 12 hours, and thereafter fired at 770° C. for 10 hours to synthesize a positive electrode active material. The primary particles of the obtained positive electrode active material had an average particle diameter (measured with a scanning electron microscope) of about 0.35 μm.

Measurement of Site Occupancy

X-ray diffraction measurement was performed for the synthesized positive electrode active material. As a result thereof, the positive electrode active material was confirmed to be a compound having a layered structure belonging to a space group R-3m. Rietveld analysis was performed using the obtained X-ray diffraction pattern to calculate the site occupancy of the transition metals at the 3a site. The results are shown in Table 1.

Measurement of Amount of Residual Lithium Hydroxide and Amount of Residual Lithium Compound The synthesized positive electrode active material was dispersed in pure water to which argon gas-bubbling had been performed, and was stirred for 30 minutes to 90 minutes, and thereafter suction filtration was performed to obtain a filtrate. The obtained filtrate was titrated with hydrochloric acid. The titration curve has two stages, the titer of up to the first equivalent point shows the total amount of a hydroxide ion of lithium hydroxide and a carbonate ion of lithium carbonate, and the titer of from the first equivalent point to the second equivalent point shows the amount of a hydrogen carbonate ion produced from the carbonate ion. Therefore, the amount of lithium carbonate was calculated from the titer of from the first equivalent point to the second equivalent point, and the amount of lithium hydroxide was calculated from the difference between the titer of up to the first equivalent point and the titer of from the first equivalent point to the second equivalent point. When the positive electrode active material is stirred in pure water, Li elutes also from the positive electrode crystal to become lithium hydroxide, and therefore the amount of lithium hydroxide calculated by titration increases linearly with stirring time. Accordingly, the intercept of the straight line was determined to be the amount of residual lithium hydroxide in the positive electrode active material. The amount of residual lithium hydroxide (amount of residual LiOH) and the amount of residual lithium carbonate (amount of residual $Li_2CO_3$) thus obtained are shown in Table 1. Moreover, the amount of residual Li being the amount of Li other than the positive electrode crystal was calculated from the amount of residual lithium carbonate and the amount of residual lithium hydroxide.

Calculation of Amount of Li in Positive Electrode Crystal

The composition of Li, Ni, Co and Mn of the positive electrode active material was measured by ICP-AES. The amount of Li in the positive electrode crystal was calculated from the difference between the amount of Li of the positive electrode active material measured by ICP-AES and the amount of residual Li. The amount of each metal element other than Li in the positive electrode crystal was calculated by allotting the molar ratio of each metal element so that the total of the molar ratios of metal elements that were other than Li and might be contained in the positive electrode crystal became 1. As a result thereof, the composition of the positive electrode crystal (compound having a layered structure) was $Li_{1.01}Ni_{0.803}Co_{0.102}Mn_{0.095}O_2$.

Example 2

A positive electrode active material was synthesized in the same manner as in Example 1 except that the firing temperature was set to 740° C. The primary particles had an average particle diameter of about 0.3 μm, and the secondary particles had an average particle diameter of about 10 μm. Moreover, the composition of the positive electrode crystal was $Li_{1.00}Ni_{0.799}Co_{0.101}Mn_{0.100}O_2$. As a result of X-ray diffraction measurement, the positive electrode crystal was confirmed to be a compound having a layered structure belonging to a space group R-3m. The positive electrode active material of Example 2 was evaluated in the same manner as in Example 1. The results are shown in Table 1.

Example 3

A positive electrode active material was synthesized in the same manner as in Example 1 except that the molar ratio of the raw materials was set to Li:Ni:Co:Mn=1.04:0.7:0.1:0.2 and the firing temperature was set to 800° C. The primary particles had an average particle diameter of about 0.3 μm, and the secondary particles had an average particle diameter of about 10 μm. Moreover, the composition of the positive electrode crystal was $Li_{1.01}Ni_{0.701}Co_{0.098}Mn_{0.201}O_2$. As a result of X-ray diffraction measurement, the positive electrode crystal was confirmed to be a compound having a layered structure belonging to a space group R-3m. The positive electrode active material of Example 3 was evaluated in the same manner as in Example 1. The results are shown in Table 1.

Example 4

A positive electrode active material was synthesized in the same manner as in Example 1 except that the molar ratio of the raw materials was set to Li:Ni:Co:Mn:Zr=1.04:0.8:0.1:0.09:0.01. The primary particles had an average particle diameter of about 0.3 μm, and the secondary particles had an average particle diameter of about 10 μm. Moreover, the composition of the positive electrode crystal was $Li_{1.00}Ni_{0.802}Co_{0.099}Mn_{0.089}Zr_{0.010}O_2$. As a result of X-ray diffraction measurement, the positive electrode crystal was confirmed to be a compound having a layered structure belonging to a space group R-3m. The positive electrode active material of Example 4 was evaluated in the same manner as in Example 1. The results are shown in Table 1.

Example 5

A positive electrode active material was synthesized in the same manner as in Example 1 except that the molar ratio of the raw materials was set to Li:Ni:Co:Mn=1.04:0.8:0.15:0.05. The primary particles had an average particle diameter of about 0.3 μm, and the secondary particles had an average particle diameter of about 10 μm. Moreover, the composition of the positive electrode crystal was $Li_{0.97}Ni_{0.798}Co_{0.151}Mn_{0.051}O_2$. As a result pf X-ray diffraction measurement, the positive electrode crystal was confirmed to be a compound having a layered structure belonging to a space group R-3m. The positive electrode active material of Example 5 was evaluated in the same manner as in Example 1. The results are shown in Table 1.

Comparative Example 1

Sulfates were used as the metal raw materials, and were weighed so that the molar ratio was Ni:Co:Mn=0.8:0.1:0.1, and pure water was added to the powder to prepare an aqueous solution. The aqueous solution was dropped in a sodium hydroxide aqueous solution, and a precipitate was filtered and dried to obtain a transition metal complex hydroxide. The obtained transition metal complex hydroxide was fired at 500° C., then lithium hydroxide was mixed to the transition metal complex oxide so that molar ratio was Li:Ni:Co:Mn=1.08:0.8:0.1:0.1, and the resultant mixture was heat-treated in an oxygen atmosphere at 600° C. for 12 hours, and thereafter was fired at 740° C. for 10 hours to synthesize a positive electrode active material. Moreover, the primary particles of the obtained positive electrode active material had an average particle diameter of about 0.30 μm, and the secondary particles had an average particle diameter of about μm. Moreover, the composition of the positive electrode crystal was $Li_{1.02}Ni_{0.796}Co_{0.103}Mn_{0.101}O_2$. As a result of X-ray diffraction measurement, the positive electrode crystal was confirmed to be a compound having a layered structure belonging to a space group R-3m. The positive electrode active material of Comparative Example 1 was evaluated in the same manner as in Example 1. The results are shown in Table 1.

Comparative Example 2

The positive electrode active material of Comparative Example 1 was dispersed in a 0.1 M hydrochloric acid aqueous solution for 10 minutes, and thereafter was heat-treated in an oxygen atmosphere at 650° C. for 6 hours. The obtained positive electrode active material was $Li_{0.96}Ni_{0.795}Co_{0.104}Mn_{0.101}O_2$. As a result of X-ray diffraction measurement, the positive electrode active material was confirmed to be a compound having a layered structure belonging to a space group R-3m. The positive electrode active material of Comparative Example 2 was evaluated in the same manner as in Example 1. The results are shown in Table 1.

Comparative Example 3

A positive electrode active material was synthesized in the same manner as in Example 1 except that the firing temperature was set to 715° C. The primary particles had an average particle diameter of about 0.25 μm, and the secondary particles had an average particle diameter of about 10 μm. Moreover, the composition of the positive electrode crystal was $Li_{0.97}Ni_{0.804}Co_{0.098}Mn_{0.098}O_2$. As a result of X-ray diffraction measurement, the positive electrode crystal was confirmed to be a compound having a layered structure belonging to a space group of R-3m. The positive electrode active material of Comparative Example 3 was evaluated in the same manner as in Example 1. The results are shown in Table 1.

Comparative Example 4

A positive electrode active material was synthesized in the same manner as in Example 1 except that the firing temperature was set to 850° C. The primary particles had an average particle diameter of about 1 μm, and the secondary particles had an average particle diameter of about 8 μm. Moreover, the composition of the positive electrode crystal was $Li_{0.97}Ni_{0.804}Co_{0.097}Mn_{0.099}O_2$. As a result of X-ray diffraction measurement, the positive electrode crystal was confirmed to be a compound having a layered structure belonging to a space group of R-3m. The positive electrode active material of Comparative Example 4 was evaluated in the same manner as in Example 1. The results are shown in Table 1.

Comparative Example 5

A positive electrode active material was synthesized in the same manner as in Example 1 except that the raw materials were mixed so that the molar ratio was Li:Ni:Co:Mn=1.00:0.8:0.1:0.1. The primary particles had an average particle diameter of about 0.30 μm, and the secondary particles had an average particle diameter of about 10 μm. Moreover, the composition of the positive electrode crystal was $Li_{0.98}Ni_{0.799}Co_{0.099}Mn_{0.102}O_2$. As a result of X-ray diffraction measurement, the positive electrode crystal was confirmed to be a compound having a layered structure belonging to a space group of R-3m. The positive electrode active material of Comparative Example 5 was evaluated in the same manner as in Example 1. The results are shown in Table 1.

Comparative Example 6

A positive electrode active material was synthesized in the same manner as in Example 1 except that the raw materials were mixed so that the molar ratio was Li:Ni:Co:Mn=1.10:0.8:0.1:0.1. The primary particles had an average particle diameter of about 0.55 μm, and the secondary particles had an average particle diameter of about 10 μm. Moreover, the composition of the positive electrode crystal was $Li_{1.02}Ni_{0.803}Co_{0.099}Mn_{0.098}O_2$. As a result of X-ray diffraction measurement, the positive electrode crystal was confirmed to be a compound having a layered structure belonging to a space group of R-3m. The positive electrode active material of Comparative Example 6 was evaluated in the same manner as in Example 1. The results are shown in Table 1.

(Manufacturing and Evaluation of Lithium Ion Secondary Battery)

Manufacturing of Positive Electrode

Each of the synthesized positive electrode active materials of Examples 1 to 5 and Comparative Examples 1 to 6, a carbon-based conductive material, and a binder dissolved in N-methyl-2-pyrrolidone in advance were mixed in a proportion of 90:6:4 in terms of a mass ratio respectively, and the uniformly mixed slurry was applied on aluminum foil as a collector having a thickness of 20 μm so that the application amount was 8.5 mg/cm². Thereafter, the applied slurry was dried at 120° C., and was subjected to compression molding with a press so that the electrode density was 2.7 g/cm³.

Manufacturing of Negative Electrode

Lithium titanate was used as the negative electrode active material, and lithium titanate, a carbon-based conductive material, and a binder were mixed in a proportion of 85:10:5 in terms of a mass ratio respectively, and the uniformly mixed slurry was applied on aluminum foil as a collector having a thickness of 20 μm so that the application amount was 14.5 mg/cm². Thereafter, the applied slurry was dried at 120° C., and was subjected to compression molding with a press so that the electrode density was 1.8 g/cm³.

Manufacturing of Lithium Ion Secondary Battery

Next, manufacturing of a lithium ion secondary battery will be described.

The manufactured positive electrode was punched so as to have a diameter of 15 mm and used, and the manufactured negative electrode was punched so as to have a diameter of 16 mm and used. As the separator, a porous separator having ion conductivity and insulation properties, made of PP (polypropylene), and having a thickness of 30 μm was used. As a nonaqueous electrolytic solution (electrolyte), an electrolytic solution obtained by dissolving lithium hexafluorophosphate ($LiPF_6$) so that the concentration of $LiPF_6$ was 1 mol/L in an organic solvent obtained by mixing ethylene carbonate (EC) and dimethyl carbonate (DMC) in a volume ratio of 3:7 was used. The potential of the positive electrode was measured using a lithium metal as a reference electrode.

Measurement of Initial Capacity

The lithium ion secondary battery using each of the positive electrode active materials of Examples 1 to 5 and Comparative Examples 1 to 6 was charged by constant current/constant potential charge at 40 A/kg based on the mass of the positive electrode active material and an upper limit voltage of 2.75 V (lithium metal reference positive electrode potential of 4.3 V), and was thereafter discharged to a lower limit voltage of 1.7 V (lithium metal reference positive electrode potential of 3.3 V) at a constant current of 40 A/kg based on the mass of the positive electrode active material to measure the discharge capacity. The obtained initial discharge capacities are shown in Table 1.

Measurement of Change in Resistance Associated with Charge-Discharge Cycles

The lithium ion secondary battery using each of the positive electrode active materials of Examples 1 to 5 and Comparative Examples 1 to 6 after the measurement of the initial discharge capacity was used, the upper limit voltage was raised to 2.85 V (Li metal reference positive electrode potential of 4.4 V), charge and discharge were performed at 40 A/kg based on the mass of the positive electrode active material, and thereafter the direct current resistance was measured during discharge at 300 A/kg and for 10 s. Thereafter, the constant current/constant potential charge at 200 Ah/kg and the constant current discharge at 600 Ah/kg were performed by 100 cycles, and then the direct current resistance was measured again to calculate the change in resistance associated with the charge-discharge cycles. Rates of resistance increase after 100 cycles (direct current resistance after 100 cycles/direct current resistance after 1 cycle) are shown in Table 1.

TABLE 1

| | Site occupancy [%] | Amount of residual LiOH [mass %] | Amount of residual Li$_2$CO$_3$ [mass %] | Amount of Li in positive electrode crystal (1 + a in compositional formula) | Initial discharge capacity [Ah/kg] | Rate of resistance increase after 100 cycles |
|---|---|---|---|---|---|---|
| Example 1 | 1.5 | 0.35 | 0.50 | 1.01 | 193 | 1.15 |
| Example 2 | 1.9 | 0.51 | 0.55 | 1.00 | 195 | 1.25 |
| Example 3 | 1.2 | 0.35 | 0.40 | 1.01 | 183 | 1.15 |
| Example 4 | 1.8 | 0.52 | 0.50 | 1.00 | 193 | 1.20 |
| Example 5 | 1.3 | 0.76 | 0.24 | 0.97 | 197 | 1.27 |
| Comparative Example 1 | 1.2 | 1.50 | 0.35 | 1.02 | 195 | 1.80 |
| Comparative Example 2 | 1.8 | 0.31 | 0.27 | 0.96 | 194 | 2.10 |
| Comparative Example 3 | 2.1 | 0.58 | 1.50 | 0.97 | 185 | 1.92 |
| Comparative Example 4 | 1.1 | 1.50 | 0.20 | 0.97 | 182 | 2.22 |
| Comparative Example 5 | 2.6 | 0.20 | 0.50 | 0.98 | 190 | 1.85 |
| Comparative Example 6 | 1.1 | 1.10 | 1.10 | 1.02 | 179 | 1.60 |

In Example 1, the site occupancy is low, as low as 1.5%, the content of residual lithium hydroxide is also low, and the molar ratio (1+a in the compositional formula) of Li in the compound having a layered structure (positive electrode crystal) to the metal elements other than Li exceeds 1.00 because lithium carbonate is used as a raw material and the firing temperature is suitable. As a result thereof, the initial discharge capacity is high, as high as 183 to 195 Ah/kg, the rate of resistance increase after 100 cycles at a positive electrode potential of 4.4 V is 1.3 times or less, the increase in resistance is suppressed, and both the high capacity and the suppression of an increase in resistance are achieved. In any of Example 2 where the firing temperature is different, Example 3 where the amount of Ni is small, and Example 4 where substitution by Zr was conducted, the site occupancy is less than 2%, the content of residual lithium hydroxide is 1 mass % or less, and the molar ratio of Li in the positive electrode crystal to the metal elements other than Li is 1.00 or more, and therefore both the high capacity and the suppression of an increase in resistance can be achieved. In Example 5, the site occupancy is less than 2%, the content of residual lithium hydroxide is 1 mass % or less, the molar ratio of Li in the positive electrode crystal to the metal elements other than Li is 0.97 or more although the ratio is below 1.00, and an excellent effect of achieving both the high capacity and the suppression of an increase in resistance is obtained because the change in the crystal structure was suppressed in a charged state by the transition metals such as Ni introduced in the Li site due to cation mixing. However, since the molar ratio of Li in the positive electrode crystal to the metal elements other than Li is 0.97 and is below 1.00, the rate of resistance increase is somewhat deteriorated when compared with the rate of resistance increase in Examples 1 to 4.

On the other hand, in Comparative Example 1, lithium hydroxide is used as a raw material, the amount of residual lithium hydroxide is large, and the rate of resistance increase is large. In Comparative Example 2, the amount of residual lithium is lowered by dispersing the positive electrode active material in hydrochloric acid, however the molar ratio of Li in the positive electrode crystal to the metal elements other than Li is small, as small as 0.96, and the rate of resistance increase is large because Li elutes also from the positive electrode crystal. In Comparative Example 3, the molar ratio of Li in the positive electrode crystal to the metal elements other than Li is 0.97, however the firing temperature is low and the reaction of lithium carbonate with metal raw materials is not sufficient, and therefore the site occupancy is high, the initial discharge capacity is low, as low as less than 190 Ah/kg for the material having a proportion of Ni of 80 atom %, and the rate of resistance increase is large. In Comparative Example 4, the firing temperature is high, the decomposition of the positive electrode crystal proceeds, therefore the amount of residual lithium hydroxide is large, and the rate of resistance increase is large. In Comparative Example 5, the site occupancy is high, and the rate of resistance increase is large. In Comparative Example 6, the amount of Li added to the raw materials is large, therefore the content of residual lithium hydroxide is large, and the rate of resistance increase is large.

In addition, the present invention is not limited to the above-described embodiments, but includes various modified examples. For example, it is possible to add other constitution to part of the constitution of the embodiments, delete part of the constitution of the embodiments, and replace part of the constitution of the embodiments with other constitution.

DESCRIPTION OF SYMBOLS

1 Battery module
2 Motor
3 Solar battery
4 Wind power generating apparatus
5 Electric power system
6 Battery module
10 Electric car
S Power generating system

What is claimed is:
1. A positive electrode active material for a lithium ion secondary battery, comprising:
  a compound having a layered structure belonging to a space group R-3m, wherein the compound having the layered structure is represented by a compositional formula:

wherein

M2 represents a metal element other than Li, Ni, Mn, and Co, $0 \leq a \leq 0.10$, $0.7 < b < 1.0$, $0 < c < 0.3$, $0 < d < 0.3$, $0 \leq e < 0.1$, $b+c+d+e=1$, and $-0.1 < \alpha < 0.1$, a site occupancy of a transition metal or transition metals at a 3a site obtained by structural analysis by a Rietveld method is less than 2%, a content of residual lithium hydroxide in the positive electrode active material is 1 mass % or less, and a content of residual lithium compound, which includes the residual amount of lithium hydroxide, in the positive electrode active material is from 0.1 mass % to 2.0 mass %.

2. The positive electrode active material for a lithium ion secondary battery according to claim 1, further comprising:
a secondary particle formed by aggregation and bonding of a plurality of primary particles, wherein the primary particles have an average particle diameter of less than 1 μm, and the secondary particle has an average particle diameter of larger than 1 μm.

3. A manufacturing method of the positive electrode active material for a lithium ion secondary battery according to claim 1, the method comprising:
a pulverizing and mixing step of pulverizing and mixing a raw material comprising a metal element other than Li with a lithium raw material comprising 80 mass % or more of lithium carbonate so as to make an average particle diameter of the raw material and the lithium raw material 0.3 μm or less;
a heat treatment step of heat-treating, at 650° C. or lower, a pulverized and mixed powder obtained through the pulverizing and mixing step; and
a firing step of firing, at 740° C. or higher and lower than 850° C., the heat-treated pulverized and mixed powder.

4. The manufacturing method of the positive electrode active material for a lithium ion secondary battery according to claim 3, the method further comprising, between the pulverizing and mixing step and the heat treatment step, a granulating step of granulating the pulverized and mixed powder obtained through the pulverizing and mixing step to make aggregated particles having an average particle diameter of 1 μm or more.

5. The manufacturing method of the positive electrode active material for a lithium ion secondary battery according to claim 4, wherein the granulating step is performed using a spray drying method.

6. A lithium ion secondary battery, comprising:
a positive electrode comprising a positive electrode active material;
a negative electrode; and
a separator,
wherein the positive electrode active material comprises a compound having a layered structure belonging to a space group R-3m,
wherein the compound having the layered structure is represented by a compositional formula:

wherein

M2 represents a metal element other than Li, Ni, Mn, and Co, $0 \leq a \leq 0.10$, $0.7 < b < 1.0$, $0 < c < 0.3$, $0 < d < 0.3$, $0 \leq e < 0.1$, $b+c+d+e=1$, and $-0.1 < \alpha < 0.1$, a site occupancy of a transition metal or transition metals at a 3a site obtained by structural analysis by a Rietveld method is less than 2%, a content of residual lithium hydroxide in the positive electrode active material is 1 mass % or less, and a content of residual lithium compound, which includes the residual amount of lithium hydroxide, in the positive electrode active material is from 0.1 mass % to 2.0 mass %.

7. The lithium ion secondary battery according to claim 6, wherein the positive electrode active material further comprises:
a secondary particle formed by aggregation and bonding of a plurality of primary particles, wherein the primary particles have an average particle diameter of less than 1 μm, and the secondary particle has an average particle diameter of larger than 1 μm.

8. The positive electrode active material for a lithium ion secondary battery according to claim 1, wherein the content of residual lithium hydroxide in the positive electrode active material is from 0.35 mass % to 1 mass %.

9. The lithium ion secondary battery according to claim 6, wherein the content of residual lithium hydroxide in the positive electrode active material is from 0.35 mass % to 1 mass %.

* * * * *